United States Patent
Wischhof et al.

(10) Patent No.: US 9,256,394 B2
(45) Date of Patent: Feb. 9, 2016

(54) METHOD PROVIDING A DISPLAY IN A MOTOR VEHICLE AND MOTOR VEHICLE COMPRISING A DISPLAY UNIT

(75) Inventors: Lars Wischhof, Ingolstadt (DE); Matthias Bezold, Buckenhof (DE)

(73) Assignee: AUDI AG, Munich (DE)

(*) Notice: Subject to any disclaimer, the term of this patent is extended or adjusted under 35 U.S.C. 154(b) by 0 days.

(21) Appl. No.: 14/236,962

(22) PCT Filed: Aug. 4, 2012

(86) PCT No.: PCT/EP2012/003342
§ 371 (c)(1),
(2), (4) Date: Feb. 4, 2014

(87) PCT Pub. No.: WO2013/020692
PCT Pub. Date: Feb. 14, 2013

(65) Prior Publication Data
US 2014/0160120 A1    Jun. 12, 2014

(30) Foreign Application Priority Data
Aug. 10, 2011   (DE) .......................... 10 2011 109 931

(51) Int. Cl.
G06F 3/147   (2006.01)
G09G 5/14   (2006.01)

(52) U.S. Cl.
CPC  *G06F 3/147* (2013.01); *G09G 5/14* (2013.01); *G09G 2340/12* (2013.01); *G09G 2370/16* (2013.01); *G09G 2380/10* (2013.01)

(58) Field of Classification Search
CPC .................. B60K 2350/352; B60K 2350/357; B60K 2350/1068; G09G 5/005; G09G 2340/045; G09G 2340/14; G09G 5/377; G09G 5/14; G09G 2340/10; G06F 3/1454

USPC .......................................................... 345/629
See application file for complete search history.

(56) References Cited

U.S. PATENT DOCUMENTS

2004/0056890 A1   3/2004  Hao et al.
2005/0131585 A1*  6/2005  Luskin et al. ...................... 701/1
(Continued)

FOREIGN PATENT DOCUMENTS

DE   102004055835   2/2006
DE   102005000653   7/2006
DE   102005034168   2/2007

OTHER PUBLICATIONS

Jan Sonnenberg, "Service and User Interface Transfer from Nomadic Devices to Car Infotainment Systems," Proceedings of the Second International Conference on Automotive User Interfaces and Interactive Vehicular Applications (AutomotiveUI 2010), Nov. 11-12, 2010, pp. 162-165.

(Continued)

*Primary Examiner* — Xiao Wu
*Assistant Examiner* — Scott E Sonners
(74) *Attorney, Agent, or Firm* — Staas & Halsey LLP

(57) ABSTRACT

A vehicle receives a script with a command for graphically designing a display and a command for reading a data value from a memory of the vehicle. The script is executed by an interpreter, as a result of which the data value is read from the memory and a display is provided on a display device. The graphical design of the display is prescribed by the script and contains a partial presentation determined by the data value. The use of scripts provides a particularly high level of flexibility for the graphical presentation.

20 Claims, 2 Drawing Sheets

(56) References Cited

U.S. PATENT DOCUMENTS

| | | | |
|---|---|---|---|
| 2009/0247132 A1 | 10/2009 | Sumcad et al. | |
| 2010/0220250 A1* | 9/2010 | Vanderwall | G01C 11/02 348/837 |
| 2010/0262929 A1 | 10/2010 | Avery | |
| 2012/0242687 A1* | 9/2012 | Choi | 345/629 |

OTHER PUBLICATIONS

Thomas Fleischmann, "Grafiksysteme Für Flexible HMI-Entwicklung," ATZ Elektronik, Mar. 2011, pp. 36-39.

English language International Search Report for PCT/EP2012/003342, mailed Dec. 6, 2012, 2 pages.

Jens Pönisch, "Tcl/Tk," Mar. 6, 2000, pp. 1-44, downloaded on Mar. 19, 2014, from http://www.qucosa.de/fileadmin/data/qucosa/documents/4295/data/vortrag.pdf.

German Office Action for corresponding German Patent Application No. 10 2011 109 931.3, issued Feb. 13, 2014, 7 pages.

WIPO English Language Translation of the International Preliminary Report on Patentability, mailed Feb. 13, 2014, 6 pages.

* cited by examiner

METHOD PROVIDING A DISPLAY IN A MOTOR VEHICLE AND MOTOR VEHICLE COMPRISING A DISPLAY UNIT

CROSS REFERENCE TO RELATED APPLICATIONS

This application is based on and hereby claims priority to International Application No. PCT/EP2012/003342 filed on Aug. 4, 2012 and German Application No. 10 2011 109 931.3 filed on Aug. 10, 2011, the contents of which are hereby incorporated by reference.

BACKGROUND

The invention relates to a method for providing a display in a vehicle and to a vehicle that has a display device and in which the proposed method can be carried out.

The wide variety of possible functions associated with the provision of a display that are able to be implemented in a vehicle is rising steadily. Firstly, this requires a very large number of functions to be already provided in a vehicle as standard. Secondly, however, it also results in there being the desire to regularly upgrade the vehicle.

It is known from mobile radio telephones that particular functions can be performed by what are known as applications ("apps") that can be downloaded onto a mobile radio telephone. Such applications are typically tailored to and executable on a particular type of mobile radio telephone. This also relates to the actuation of a display device, for example the touchscreen.

In a vehicle, the display device is actuated by a control device that matches the functionalities provided on the vehicle as standard. However, it does not necessarily match new functions that are defined later. To date, users have made do with the use of an (internet) browser in order to provide presentations or displays. Normally, however, the presentation in the browser differs greatly from the presentation used otherwise in the system, which results in aesthetic restrictions; it would be desirable to be able to provide a standard presentation. As an alternative to using the browser, there is the remote control of presentation elements that are already existent in the vehicle system. This is also called "Remote HMI". With this approach, in contrast to the browser, there is a limitation to presentation elements (what are known as "widgets") that are already existent in the system. It is not possible for graphical presentation elements to be defined freely. Naturally, it is also possible to install new software and to have it executed by the vehicle system. However, this involves the disadvantage that the standard system existent beforehand can be kept free of side effects only with difficulty: by way of example, the subsequently loaded function can impair the rest of the system as a result of malfunctions such as drawing in regions that are not provided for this purpose or demanding memory or power from the processor without limitation.

DE 10 2005 000 653 A1 describes a method and a system for installing software that implements functions of an electronic appliance. In this case, installation-relevant data are received by the appliance via a unidirectional global transmission. The installation-relevant data also have a control script provided, which monitors and independently controls the installation, such as the installation of the data in a particular order.

US 2009/024732 A1 describes a method for communication between a vehicle and a call center. In this case, data can be received from the vehicle in the form of an MMS message, which may have different portions, such as image files, audio files, video files or text-based executable scripts.

SUMMARY

One possible object is to demonstrate a way in which new functions can be defined in a vehicle that are associated with the provision of new graphical design elements.

The inventors propose a method, which comprises the reception of a script from a device that is different than the vehicle by the vehicle, wherein the script contains at least one command for graphically designing a display and one command for reading a data value from a memory of the vehicle. The script is then executed by an interpreter, as a result of which the data value is read from the memory and a display is provided, the graphical design of which is prescribed by the script and which contains a partial presentation determined by the data value.

The proposed method therefore involves the use of a script language in order to define new functionalities and forms of the presentation. As indicated, such functionalities also include the reading of a data value from a memory of the vehicle. This data value is then used, and the result determines at least one partial presentation of the display. The method can therefore define totally novel types of displays and operator control steps, either by involving such data values as are not integrated in a display in the standard system of the vehicle or, as indicated, also particularly by providing such graphical elements as are not provided by the standard system. In particular, the script language is particularly well suited to defining new graphical elements that had not been defined hitherto. A script language is known to allow the subsequently loaded function elementary drawing functions (such as dot, line, polygon, three-dimensional presentations, etc.), and the interpretation by the interpreter in the vehicle allows the risk of malfunctions in the overall system to be limited. This applies particularly when the script language is one that has a greatly restricted scope of language, since it is shielded from the rest of the system by the interpreter. The subsequently loaded function can draw freely defined complex shapes in the prescribed region, beyond the scope of functions of pure remote control of display elements.

In one preferred embodiment, at the outset a mobile radio connection from the vehicle to a data processing device outside the vehicle is set up, and the script is received from the data processing device by the vehicle. This allows mobile radio to be used to provide the new functionality in the vehicle.

In one alternative to the cited preferred embodiment, first of all a communication connection to a mobile radio that is different than a mobile radio connection is set up, and the script is received from the mobile radio by the vehicle. For this, it is possible to make use of inherently known interfaces between mobile radios and vehicle (for example Bluetooth® or WLAN, etc.) in order to transmit a new functionality to the vehicle. By way of example, the mobile radio may for its part have received the script or an app producing the script via a mobile radio connection, particularly via an Internet connection.

In one preferred embodiment of the two alternatives, the vehicle sends a request to the device (that is to say the data processing device or the mobile radio) so that said device provides the script following the setup of the connection (that is to say the mobile radio connection or the connection that is different than a mobile radio connection). In particular, the request can be sent automatically when the vehicle or a functional unit thereof is started. In this way, the vehicle can keep the functionalities up to date at regular intervals by receiving respective up-to-date scripts.

In one preferred embodiment of the method, the display is provided on a subregion of a display device of the vehicle, and a further subregion of the display device is used for providing a further display from a computer program that is permanently installed on the vehicle. In this preferred embodiment, one subregion is reserved for the graphical presentation produced using the script, but there is the assurance that the further subregion operates without disturbance, as a result of which there are no impediments and malfunctions in the execution of the software (of the permanently installed computer program).

The graphical design preferably contains geometrical shapes that provide a 3D presentation. Particularly the possible wide variety of types of presentation that is provided by the script is suited to providing even a 3D presentation in a particularly pleasing manner.

The proposed vehicle comprises a display device, a data interface for receiving a script and an interpreter for actuating at least one subregion of the display device using a received script, and the interpreter is designed to access data captured by the data capture device. Typically, the data capture device will comprise a memory that is then accessed.

The vehicle provides the possibility for the proposed method to be carried out, as a result of which the advantages that are set out for the method also apply in equal measure to the vehicle.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
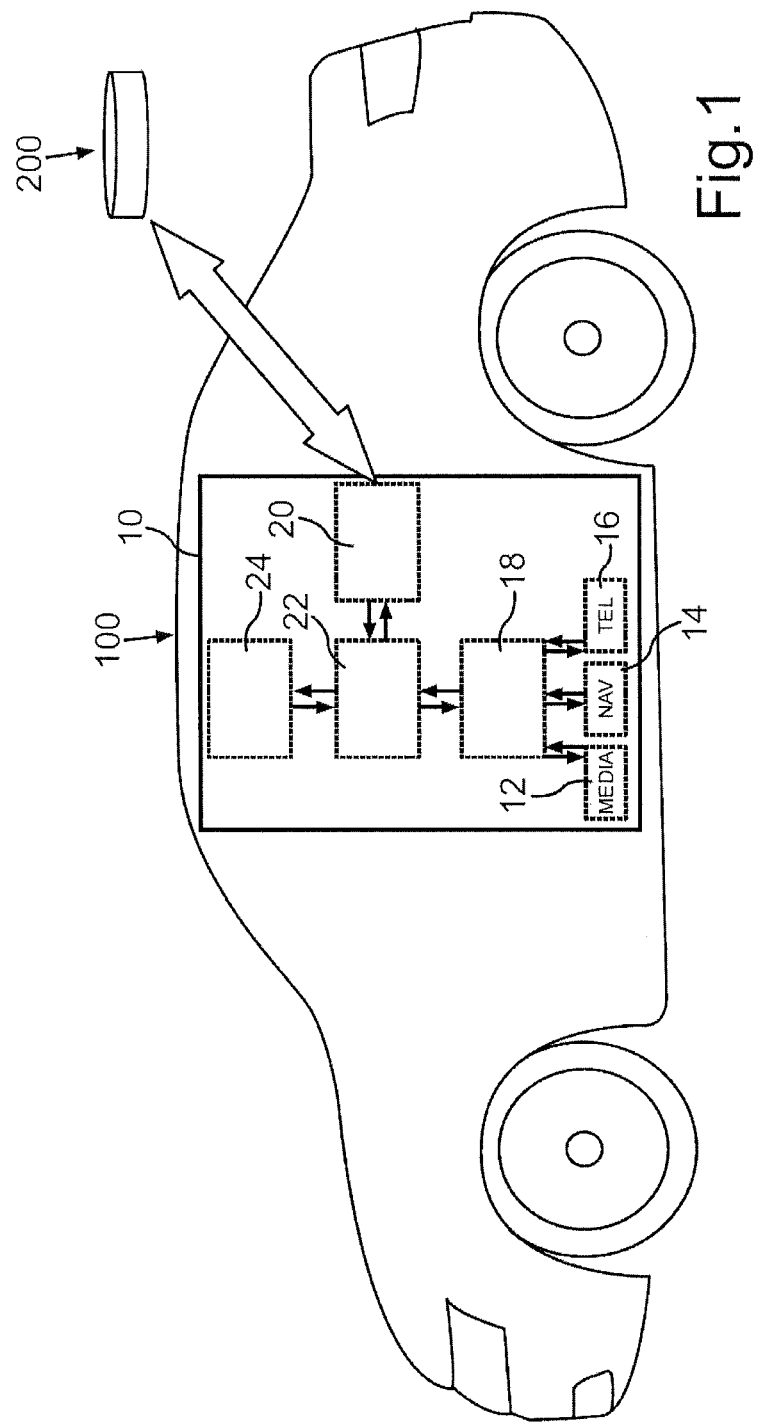
FIG. 1 illustrates software components of a vehicle according to the inventors' proposals and the interaction of said software components with an external data processing device.

Reference will now be made in detail to the preferred embodiments of the present invention, examples of which are illustrated in the accompanying drawings, wherein like reference numerals refer to like elements throughout.

A motor vehicle 100 has what is known as an infotainment system 10, that is to say a device for processing information and data values for entertainment and navigation. The elements shown in dashes in the figures are interpreted as software modules in the present case, but could alternatively equally be in the form of hardware too.

A device 12 captures data from storage media, such as a CD. A device 14 is used for providing the functionality of a navigation system and can capture appropriate map data and also location data. A device 16 is used for providing a hands-free installation for a mobile radio telephone in the vehicle 100. An interface 18 can be used to access the devices 12, 14 and 16. In this connection, the devices 12, 14, 16 can also be comprehensively interpreted as a memory that contains appropriate data values. In addition, the motor vehicle has an external data interchange interface 20 that is able to communicate with a data processing device 200 situated outside the motor vehicle, for example using GPRS, UMTS, LTE, etc.

From the external data processing device 200, it is particularly possible to receive a script that comprises commands to read a data value from the devices 12, 14 and 16 and to provide particular displays. The script can be interpreted by an interpreter 22, that is to say is converted directly into control commands. These control commands are provided on a flexible man/machine interface 24. In addition to the command for reading a data value from the devices 12, 14 and 16, the transmission of the script may also define graphical elements too.

By way of example, it is possible to request from the external data processing device a script that can be used to display the average consumption of the motor vehicle 100 in terms of resources (fuel). The script is requested from the external data processing device 200 by the motor vehicle 100 and is transmitted from the data processing device 200 to the motor vehicle 100, this being done using the interface 20. The interpreter 22 interprets the script and reads the data value relating to the average consumption from the device 14 via the vehicle interface 18. By way of example, this data value can be integrated into a graphical presentation in alphanumeric form, with the elements of the graphical presentation likewise being stipulated by the script. By way of example, the level of a bar next to the alphanumeric presentation can indicate the average consumption of fuel.

For the presentation, a display device may have a particular region provided on it that is not actuated by the conventional devices for providing a display, which are not shown in the figure. However, it is equally also possible for a display to be provided in a higher level to a certain extent, for example, by overlaying a symbol on a map that is provided by the navigation system, specifically at a particular point on the map. The presentation of the symbol is then stipulated by the script, whereas the map is provided conventionally.

Figure 2:
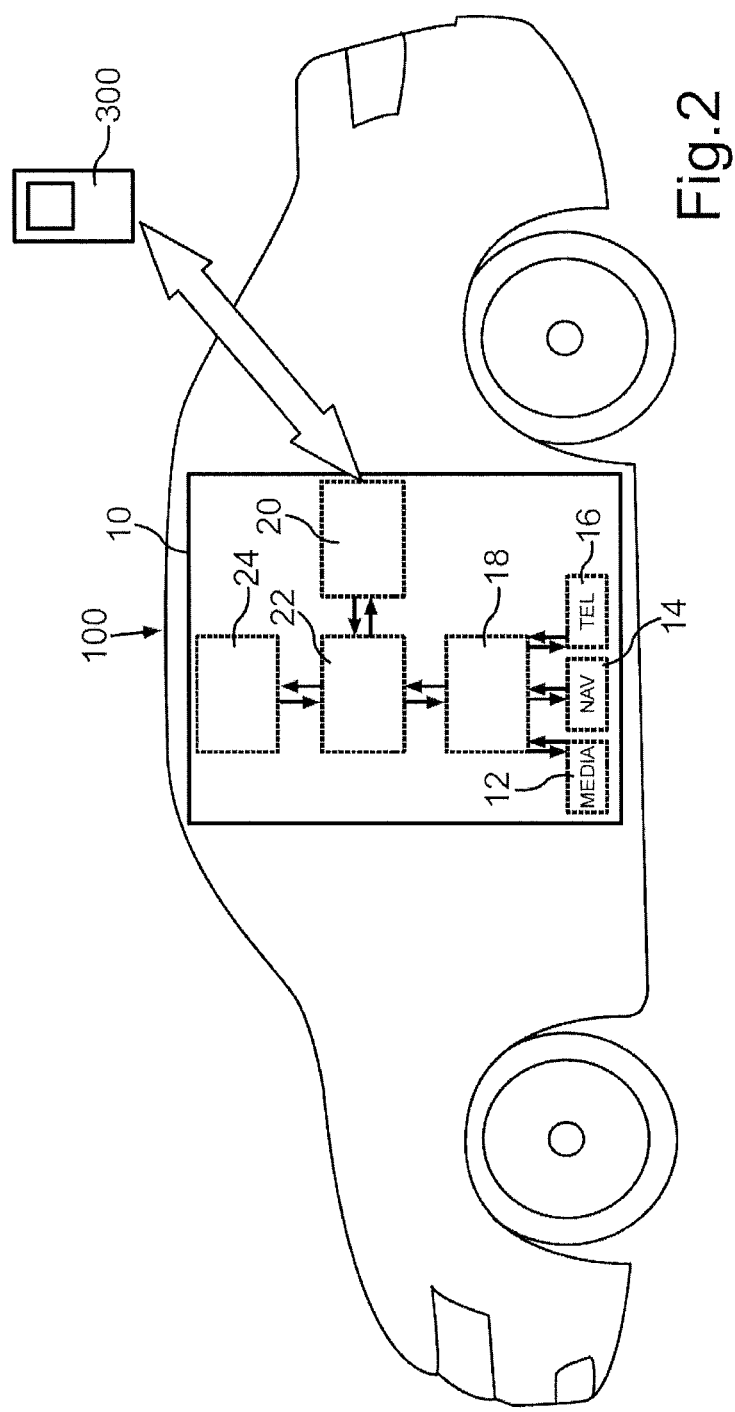
FIG. 2 illustrates the software components of a vehicle according to the inventors' proposals and the interaction of said software components with a mobile radio.

As an alternative to requesting the script from an external data processing device 200 via a mobile radio network, it is also possible to use an interface for coupling a mobile radio telephone 300 (FIG. 2) to the motor vehicle 100; such interfaces use WLAN, USB, Bluetooth®, etc., for example. The script can be requested by the mobile radio telephone 300 and converted into commands in the same way as has been explained above with reference to FIG. 1.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for providing a display in a vehicle, comprising:
   receiving, by the vehicle, a script from a device that is different from the vehicle, the script containing a command for reading a data value from a memory of the vehicle, the script also containing a command for graphically designing a new display;
   executing the script by a compiled computer program installed in a command interpreter, as a result of which:
   the data value is read from the memory,
   the new display is graphically designed, the new display containing a presentation of information related to the data value, the script prescribing a graphical design for the presentation of the information related to the data value, such that the script provides elementary drawing functions and at least partially defines a subsequently loaded function, the new display is provided on a first sub-region of a display device of the vehicle, and a display from a computer program that is permanently installed on the vehicle is provided on a second sub-region of the display device.

2. The method as claimed in claim 1, further comprising:
setting up a mobile radio connection from the vehicle to a data processing device outside the vehicle; and
receiving the script from the data processing device by the vehicle.

3. The method as claimed in claim 2, further comprising:
sending a request for the script from the vehicle to the data processing device after setting up the mobile radio connection.

4. The method as claimed in claim 1, wherein
the script is received from a mobile radio,
the mobile radio functions as a mobile radio telephone via a mobile radio link, and
the script is received via a communication connection different from the mobile radio link.

5. The method as claimed in claim 4, further comprising:
sending a request for the script from the vehicle to the mobile radio after setting up the communication connection.

6. The method as claimed in claim 1, wherein
the script is received from a mobile radio,
the mobile radio functions as a mobile radio telephone via a mobile radio link, and
the script is received via a wireless interface different from the mobile radio link.

7. The method as claimed in claim 1, further comprising:
sending a request for the script from the vehicle to the device that is different from the vehicle, the request being sent when the vehicle is started.

8. The method as claimed in claim 1, further comprising:
sending a request for the script from the vehicle to the device that is different from the vehicle, the request being sent when a functional unit of the vehicle is started.

9. The method as claimed in claim 1, wherein
the graphical design prescribed by the script presents the data value in alphanumeric form.

10. The method as claimed in claim 1, wherein
the script provides for a display of a new data value not integrated into an original standard display of the vehicle.

11. The method as claimed in claim 1, wherein
the graphical design prescribed by the script comprises geometrical shapes that provide a 3D presentation of the information related to the data value.

12. The method as claimed in claim 1, wherein
the data value is integrated into an original standard display of the vehicle, and the script provides for new graphical elements related to the data value, the new graphical elements not being integrated into the original standard display of the vehicle.

13. The method as claimed in claim 1, wherein
the second sub-region overlays the first sub-region.

14. A vehicle comprising:
a display device;
a memory;
a data capture device having a data interface to receive a script, the script containing a command for graphically designing a new display; and
a command interpreter including an installed compiled computer program to access data captured by the data processing device and to execute the script such that:
a data value is read from the memory;
the new display is graphically designed, the new display containing a presentation of information related to the data value, the script prescribing a graphical design for the presentation of the information related to the data value, such that the script provides elementary drawing functions and at least partially defines a subsequently loaded function;
the display device is actuated such that the new display is provided on a first sub-region of the display device; and
the display device is actuated such that a display from a computer program that is permanently installed on the vehicle is provided on a second sub-region of the display device.

15. The vehicle as claimed in claim 14, wherein
the script is received from a mobile radio,
the mobile radio functions as a mobile radio telephone via a mobile radio link, and
the data interface to receive the script is a wireless interface different from the mobile radio link.

16. The vehicle as claimed in claim 14, wherein
the graphical design prescribed by the script presents the data value in alphanumeric form.

17. The vehicle as claimed in claim 14, wherein
the script provides for a display of a new data value not integrated into an original standard display of the vehicle.

18. The vehicle as claimed in claim 14, wherein
the graphical design prescribed by the script comprises geometrical shapes that provide a 3D presentation of the information related to the data value.

19. The vehicle as claimed in claim 14, wherein
the data value is integrated into an original standard display of the vehicle, and
the script provides for new graphical elements related to the data value, the new graphical elements not being integrated into the original standard display of the vehicle.

20. The vehicle as claimed in claim 14, wherein
the second sub-region overlays the first sub-region.

* * * * *